(12) United States Patent
Handa

(10) Patent No.: US 8,281,017 B2
(45) Date of Patent: Oct. 2, 2012

(54) CONNECTION METHOD AND CONFERENCING APPARATUS

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 12/277,917

(22) Filed: Nov. 25, 2008

(65) Prior Publication Data

US 2009/0138605 A1 May 28, 2009

(30) Foreign Application Priority Data

Nov. 28, 2007 (JP) ................................. 2007-307780

(51) Int. Cl.
*G06F 15/16* (2006.01)
(52) U.S. Cl. ........................................ 709/227; 370/389
(58) Field of Classification Search .................. 709/227; 370/389
See application file for complete search history.

(56) References Cited

U.S. PATENT DOCUMENTS

| | | | |
|---|---|---|---|
| 7,580,704 B2 | 8/2009 | Narita | |
| 7,660,850 B2 * | 2/2010 | Tidwell et al. | 709/204 |
| 7,668,159 B2 * | 2/2010 | Buckley et al. | 370/354 |
| 2006/0193457 A1 | 8/2006 | Narita | |
| 2007/0036157 A1 * | 2/2007 | Watanabe et al. | 370/389 |
| 2007/0165810 A1 * | 7/2007 | Nguyen et al. | 379/158 |

FOREIGN PATENT DOCUMENTS

| | | |
|---|---|---|
| JP | 2005109784 A | 4/2005 |
| JP | 2006238330 A | 9/2006 |

OTHER PUBLICATIONS

Mark et al., "Distributed Multipoint Conferences Using SIP," Mar. 8, 2000.*

* cited by examiner

*Primary Examiner* — Krista Zele
*Assistant Examiner* — Andrew Georgandellis
(74) *Attorney, Agent, or Firm* — Fitzpatrick, Cella, Harper & Scinto

(57) ABSTRACT

In a conferencing system having a first conferencing apparatus and a plurality of second conferencing apparatuses, the plurality of second conferencing apparatuses transmit connection requests, which are for connecting to the first conferencing apparatus, to the first conferencing apparatus based upon first connection information, which is for connecting to the first conferencing apparatus and which a plurality of second communication devices have received from a first communication device. The first conferencing apparatus detects second connection information, which is for connecting to the second conferencing apparatuses that have transmitted the connection requests, and instructs the plurality of second conferencing apparatuses to connect themselves together based upon the second connection information.

18 Claims, 8 Drawing Sheets

CONNECTION METHOD AND CONFERENCING APPARATUS

BACKGROUND OF THE INVENTION

1. Field of the Invention

The present invention relates to a method of connecting a conference apparatus and to a conferencing apparatus.

2. Description of the Related Art

As the fusion of data communication and voice communication proceeds, techniques for providing multimedia services such as voice and video, as in the manner of VoIP (Voice over IP), etc., continue to become widespread. Services which apply these techniques to carry out conferencing among a plurality of remote bases have been provided.

Conventionally, a conference network is constructed and a conference held by having a user prepare an MCU (Multipoint Control Unit) for relaying data from a plurality of bases and connect the MCU to a conferencing apparatuses at the plurality of bases, or by having an ASP (Application Service Provider) connect conferencing apparatuses at a plurality of bases to a Web conferencing service that provides services.

In cases where an MCU or Web conferencing service, etc., is not used, a conference network is constructed and a conference held by connecting conferencing apparatuses at a plurality of bases in the form of a mesh.

A conferencing apparatus at a base cannot participate in a conference network unless it is aware of connection information concerning the destination of a connection. However, US Patent Disclosure 2007/036157 discloses a technique whereby a communication device different from a conferencing apparatus, such as a cellular phone, is used to exchange information with the destination of a connection. The method disclosed in US Patent Disclosure 2007/036157 is premised on use of an MCU or Web conferencing service and does not take into consideration the connecting of multiple bases in the form of a mesh without using an MCU or Web conferencing service.

In a case where an MCU or Web conferencing service is used, the number of times a user uses a cellular phone to exchange information for establishing a connection to a device is n times with respect to n bases. However, in a case where the conferencing apparatuses at respective bases are connected in the form of a mesh, the number of times information is exchanged is $n \times (n-1) \div 2$ times. A problem which arises is that the number of information exchanges increases as the number of bases increase.

As a consequence, owing to an increase in number of information-exchange operations performed by a user, there is increased likelihood of human error and there is the danger that it will not be possible to construct the conference network and hold the conference.

Furthermore, in a case where an MCU or Web conferencing service is used, the roles of a server and client are decided, as in the manner of a connection between the MCU and conferencing apparatus and a connection between the Web conferencing service and conferencing apparatus, and a node at which connection processing is started can be decided after the exchange of connection information.

However, in a case where a mesh connection is performed without utilizing an MCU or Web conferencing service, conferencing apparatuses having the some roles are connected. As a result, although it is necessary to start connection processing from some conferencing apparatus after an exchange or connection information, a problem which arises is that which conferencing apparatus is to start processing cannot be decided.

SUMMARY OF THE INVENTION

The present invention seeks to connect conferencing apparatuses with ease.

The present invention provides a connection method of connecting a first conferencing apparatus and a plurality of second conferencing apparatuses and connecting the plurality of second conferencing apparatuses together, the method comprising the steps of: the plurality of second conferencing apparatuses transmitting connection requests, which are for connecting to the first conferencing apparatus, to the first conferencing apparatus based upon first connection information, which is for connecting to the first conferencing apparatus and which a plurality of second communication devices have received from a first communication device; and the first conferencing apparatus detecting second connection information for connecting to the second conferencing apparatuses that have transmitted the connection requests, and instructing the plurality of second conferencing apparatuses to connect themselves together based upon the second connection information.

The present invention further provides a second conferencing apparatus connected to a first conferencing apparatus and connected to another second conferencing apparatus, comprising: first receiving means for receiving first connection information, which is for connecting to the first conferencing apparatus, from a communication device; second receiving means for receiving a connect command, which is for connecting to the other second conferencing apparatus, from the first conferencing apparatus; and transmitting means for transmitting a connection request, which is for connecting to the first conferencing apparatus, to the first conferencing apparatus based upon the first connection information, and transmitting a connection request, which is for connecting to the other second conferencing apparatus, to the other second conferencing apparatus based upon the connect command.

The present invention further provides a first conferencing apparatus connected to a plurality of second conferencing apparatuses, comprising: receiving means for receiving connection requests from the plurality of second conferencing apparatuses; detecting means for detecting second connection information for connecting to the second conferencing apparatuses that have transmitted the connection requests; and instructing means for instructing the plurality of second conferencing apparatuses to connect themselves together based upon the second connection information.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings.

First Embodiment

Figure 1:
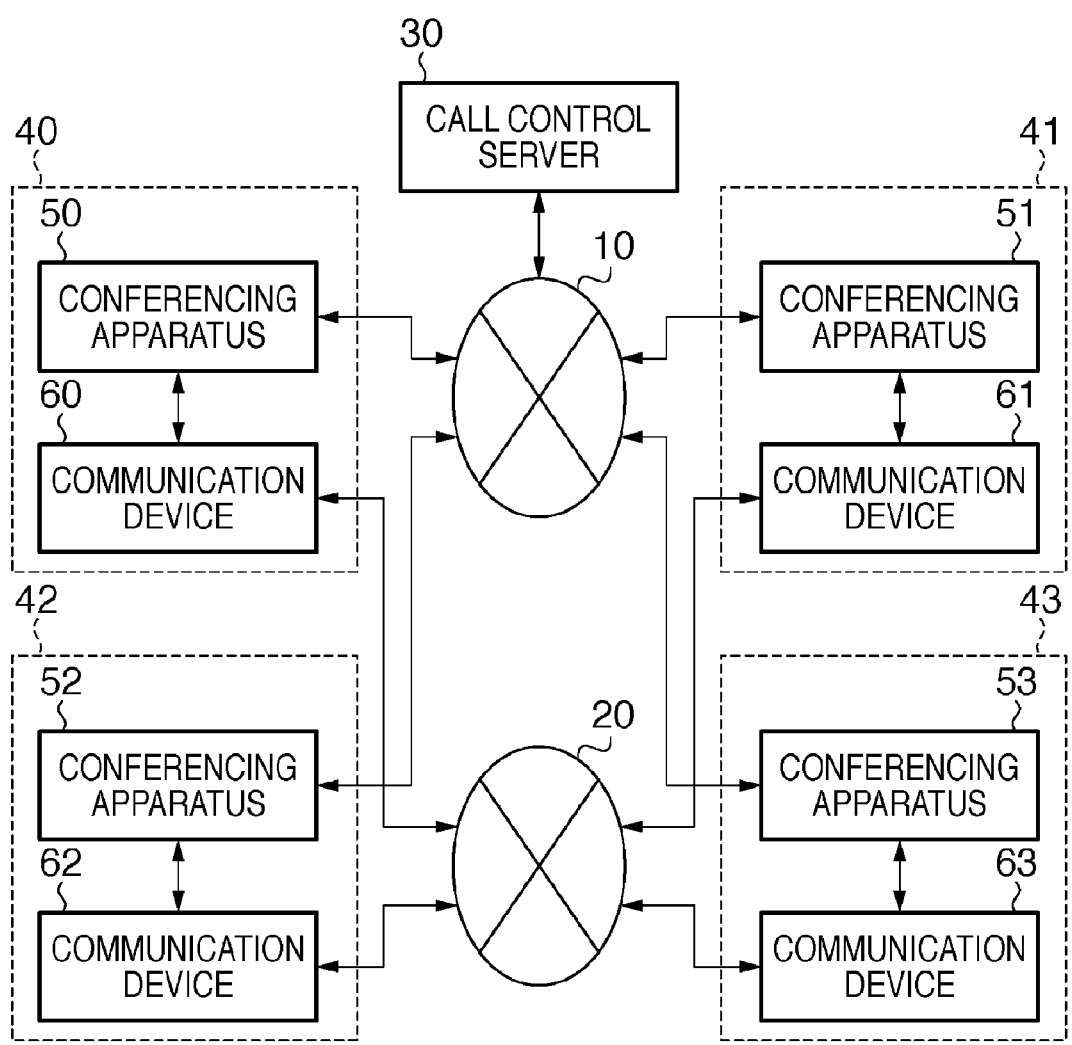
FIG. 1 is a diagram illustrating an example of the system configuration of a conferencing system.

FIG. 1 is a diagram illustrating an example of the system configuration of a conferencing system. FIG. 1 illustrates the configuration of a conferencing system in a case where the number of conference participation bases is four. A base 40 has one or more conferencing apparatuses 50. The conferencing apparatus 50 is connected to an IP network 10 and has a voice, image and data input/output function, a function for sending and receiving voice, images and data to and from other conferencing apparatuses, and a function for performing data communication with a communication device 60.

In this embodiment, the conferencing apparatus will be described as being a personal computer to which a camera, microphone, monitor and speakers have been connected. The conferencing apparatus 50 further has a function for transmitting data, which has been input from the camera and microphone, to a connection destination and outputting data, which has been received from another party, from the monitor and speakers.

Further, the conferencing apparatus 50 has a function for connecting a call to a remote conferencing apparatus using an SIP (Session Initiation Protocol) compliant with RFC 3261 stipulated by the IETF (Internet Engineering Task Force).

One or more conferencing apparatuses 51 to 53 are also provided at each of other bases 41 to 43, respectively, in a manner similar to base 40.

The communication device 60 has a function for exchanging data with the conferencing apparatus 50 and a function for connecting to a communication network 20 and performing data communication with other communication devices. It is assumed here that the communication device 60 is possessed by the conference participant located at base 40.

In this embodiment, the communication device will be described as being a cellular phone capable of performing data distribution with other communication devices using a PoC (Push to Talk over Cellular) function. It should be noted that if the communication device is capable of communicating with other communication devices, then a communication procedure other than PoC may be used. Further, the communication device may be a PDA (Personal Digital Assistant), a notebook personal computer, a personal computer or a telephone capable of supporting data communication, by way of example.

The communication device (also referred to as a cellular phone below) 60 is equipped with software and hardware that enable an exchange of information with the conferencing apparatus 50 by an IC reader and IC writer. Furthermore, the communication device 60 may be adapted so as to perform data communication with the conferencing apparatus 50 using a barcode reader and writer, infrared radiation or short-range wireless, or by an IP protocol using UPnP (Universal Plug and Play), etc.

Other communication devices 61 to 63 also have functions similar to those of the communication device 60 and are in the possession of conference participants located at bases 41 to 43, respectively.

A call control server 30 is connected to the IP network 10. In this embodiment, it is assumed that the call control server 30 is an SIP server compliant with RFC 3261 stipulated by the IETF.

Figure 2:
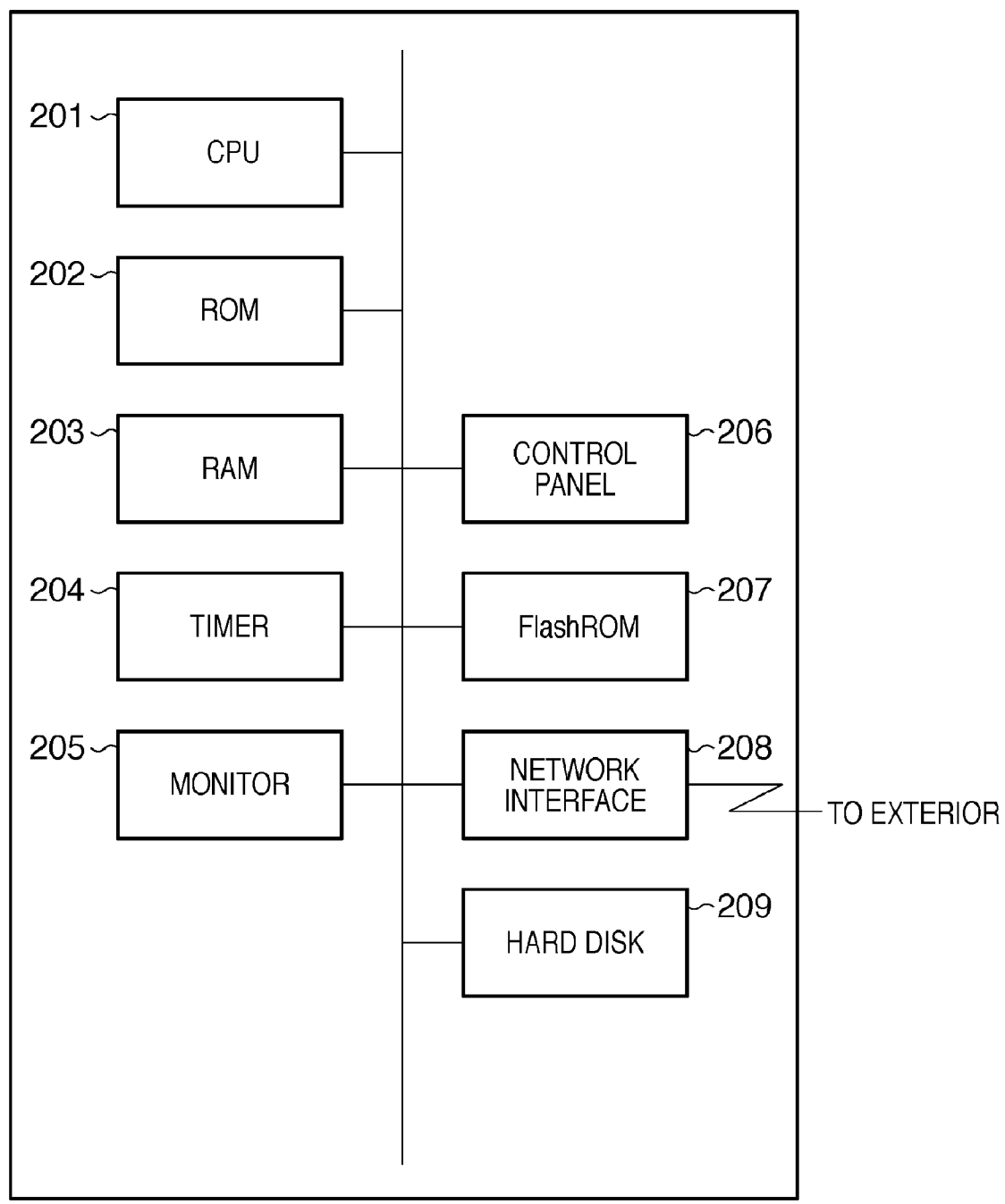
FIG. 2 is a diagram illustrating an example of the hardware configuration of a personal computer constituting a conferencing apparatus.

FIG. 2 is a diagram illustrating an example of the hardware configuration of a personal computer constituting the conferencing apparatus 50. The functional configuration of each of the conferencing apparatuses 51 to 53 is similar to the hardware configuration shown in FIG. 2. The personal computer shown in FIG. 2 includes a CPU (Central Processing Unit) 201, a ROM 202, a RAM 203, a timer 204, a Flash ROM 207, a network interface 208 and a hard disk 209.

The CPU 201 controls the overall personal computer. The ROM 202 stores various programs, etc. The RAM 203 stores the program currently being executed and temporarily stores data, etc., used in the program currently being executed.

The timer 204 measures various times. The Flash ROM 207 stores various settings data files, etc. The network interface 208 connects the personal computer to external devices. The hard disk 209 stores various programs, as well as connection information, base information and participant information, described later. The base information and participant information may just as well be stored in the RAM 203.

The CPU 201 is constituted by a microprocessor. The CPU 201 reads out the program that has been stored in the ROM 202 or hard disk 209 and executes the program in the RAM 203, thereby implementing functions or processing according to a flowchart described later.

As mentioned above, the conferencing apparatus is constructed by connecting a camera, microphone, monitor and speakers to a personal computer. Further, it is assumed that hardware for performing an exchange of information with a cellular phone by an IC reader and IC writer has been connected to the personal computer.

Figure 3:
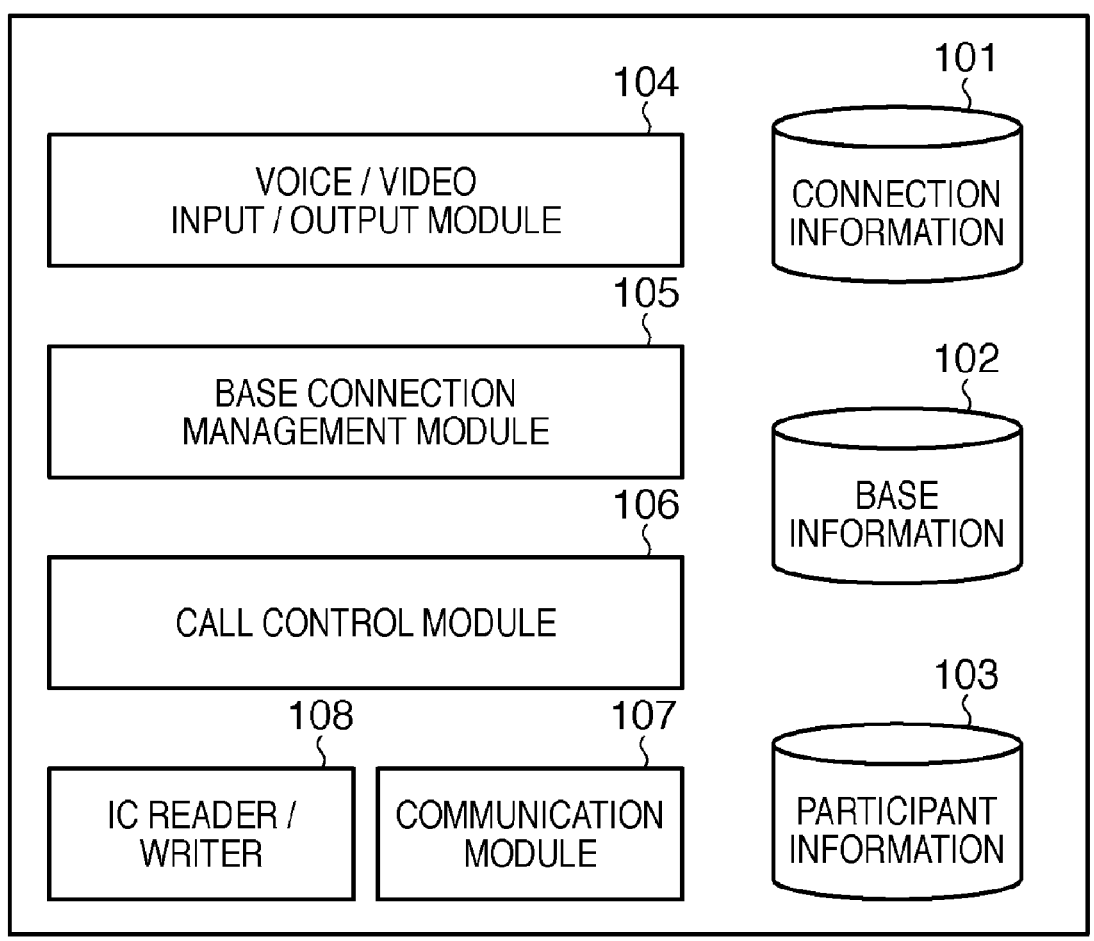
FIG. 3 is a diagram illustrating an example of the functional configuration of a conferencing apparatus.

FIG. 3 is a diagram illustrating an example of the functional configuration of the conferencing apparatus 50. The functional configuration of each of the conferencing apparatuses 51 to 53 is similar to that shown in FIG. 3.

Described in connection information 101 as information for connecting to the conferencing apparatus 50 is SIP-URI, which is identification information uniquely identifying the conferencing apparatus 50. Information for connecting to the other conferencing apparatuses 51 to 53 is described in base information 102. Cellular phone numbers of all other participants in the conference acquired from the cellular phone 60 are described in participant information 103.

A voice/video input/output module 104 acquires input information from the user. Further, the voice/video input/output module 104 converts the acquired input information to data in order to be transmitted to the other conferencing apparatuses 51 to 53. Further, the voice/video input/output module 104 outputs data in order to supply the user with information acquired from the other conferencing apparatuses 51 to 53.

A base connection management module 105 manages whether mesh connection of the conferencing apparatuses 50 to 53 is in a connection-complete state or connection-incomplete state. A call control module 106 controls the SIP compliant with RFC 3261 stipulated by the IETF. A communication module 107 executes processing for performing IP communication via the IP network 10. An IC reader/writer 108 executes processing for exchanging data with the cellular phone 60.

Figure 4:
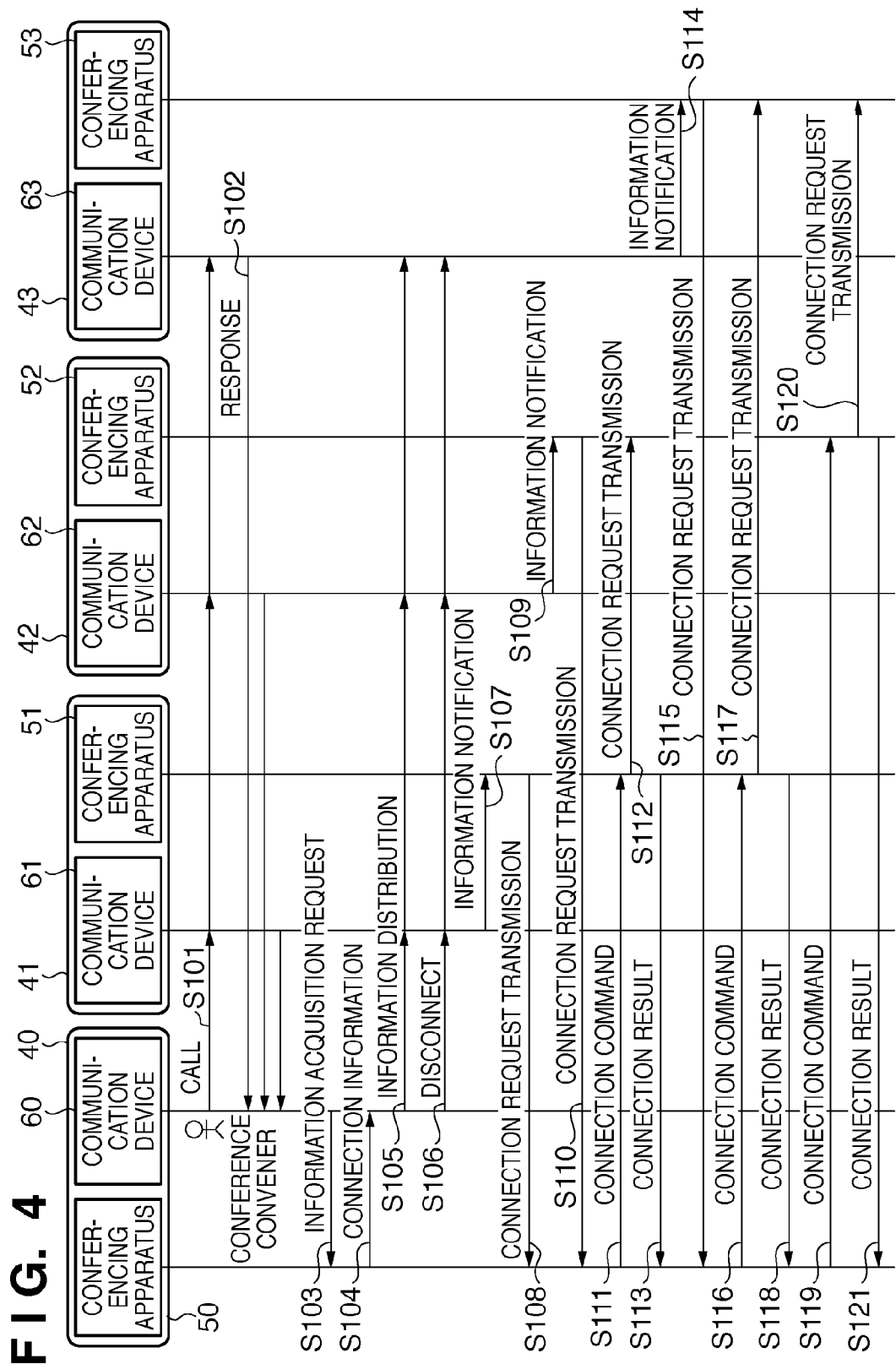
FIG. 4 is a diagram illustrating an example of a sequence relating to processing whereby a user acting as a conference convener at a base 40 holds a conference with users at bases 41 to 43.

FIG. 4 is a diagram illustrating an example of a sequence relating to processing whereby a user acting as a conference convener at the base 40 holds a conference with users located at the bases 41 to 43.

The conference convener located at base 40 uses the cellular phone 60 in the possession of the conference convener to place a PoC-based call to the cellular phones 61 to 63 of users who the conference convener wishes to participate in the conference (S101).

The users of the cellular phones 61 to 63 who are to participate respond to the PoC-based call (S102). As a result, the cellular phones 60 to 63 belong to a PoC group and assume a state in which they can perform data communication. It should be noted that although PoC is utilized in this embodiment, the cellular phone 60 may call the plurality of cellular phones 61 to 63 by a method other than one using PoC.

Next, in accordance with an operation performed by the conference convener, the cellular phone 60 sends the conferencing apparatus 50 an information acquisition request for acquiring SIP-URI necessary for connecting to the conferencing apparatus 50 (S103). Along with the information acquisition request, the cellular phone 60 notifies the conferencing apparatus 50 of the telephone numbers of the cellular phones 61 to 63 engaged in PoC communication.

Upon receiving the information acquisition request, the conferencing apparatus 50 acquires the telephone numbers of the conference participants included in the information acquisition request and stores these in the participant information 103. Further, the conferencing apparatus 50 acquires the SIP-URI, which is necessary to connect to the conferencing apparatus 50, from the connection information 101 and notifies the cellular phone 60 of the SIP-URI as connection information (S104). The request and notification steps S103, S104 are implemented using an IC reader and IC writer, infrared radiation or short-range wireless, etc.

Upon receiving the SIP-URI, the cellular phone 60 notifies the other cellular phones 61 to 63 of the SIP-URI of conferencing apparatus 50 using PoC communication (S105). It should be noted that the notification of the SIP-URI of the conferencing apparatus 50 may be performed by a method other than PoC communication. Further, when the cellular phone 60 finishes giving notification of the SIP-URI of conferencing apparatus 50, it may just as well sever PoC communication (S106).

In accordance with an operation performed by the user, the cellular phone 61 that has received the SIP-URI of the conferencing apparatus 50 notifies the conferencing apparatus 51, which is used by the user of the cellular phone 61, of the SIP-URI of the conferencing apparatus 50 and of its own telephone number (namely the telephone number of the cellular phone 61) (S107). This communication may be implemented using an IC reader and IC writer, infrared radiation or short-range wireless, etc.

Upon receiving the SIP-URI of the conferencing apparatus 50 and the telephone number of the cellular phone 61, the conferencing apparatus 51 stores the SIP-URI of the conferencing apparatus 50 in the base information 102. Further, the conferencing apparatus 51 establishes a connection to the conferencing apparatus 50 using the SIP-URI of the conferencing apparatus 51 and the telephone number of the cellular phone 61 (S108). More specifically, the conferencing apparatus 51 sends the conferencing apparatus 50 an INVITE message of the SIP that includes the SIP-URI of the conferencing apparatus 51 and the telephone number of the cellular phone 61. Although the conferencing apparatus 50 and conferencing apparatus 51 are connected using the SIP, the connection may be implemented by a method other than one using SIP.

That is, on the basis of connection information of the conferencing apparatus 50 included in the information notification received via the cellular phone (communication device) 61, the conferencing apparatus 51 sends the conferencing apparatus 50 a connection request that includes the connection information of the conferencing apparatus 51. The connection information of the conferencing apparatus 50 is information that enables connection to the conferencing apparatus 50 using this connection information. For example, it is the SIP-URI of the conferencing apparatus 50. Further, the connection information of the conferencing apparatus 51 is information that enables connection to the conferencing apparatus 51 using this connection information. For example, it is the SIP-URI of the conferencing apparatus 51.

When the conferencing apparatus 50 that has received the INVITE message acquires the SIP-URI of the conferencing apparatus 51 and the telephone number of the cellular phone 61, it stores the SIP-URI of the conferencing apparatus 51 in the base information 102 and holds the telephone number of the cellular phone 61 in the RAM 203, etc. Further, the conferencing apparatus 50 sends the conferencing apparatus 51 a message that is a response to the INVITE message. Upon receiving the response message, the conferencing apparatus 51 sends the conferencing apparatus 50 an ACK message to acknowledge the response message.

A connection between the conferencing apparatus 50 and conferencing apparatus 51 is established by the series of processing steps described above.

Similarly, in accordance with user operation, the cellular phone 62 that has received the SIP-URI of the conferencing apparatus 50 notifies the conferencing apparatus 52, which is used by the user of the cellular phone 62, of the SIP-URI of the conferencing apparatus 50 and of its own telephone number (namely the telephone number of the cellular phone 62) (S109).

Upon receiving the SIP-URI of the conferencing apparatus 50 and the telephone number of the cellular phone 62, the conferencing apparatus 52 stores the SIP-URI of the conferencing apparatus 50 in the base information 102. Further, the conferencing apparatus 52 establishes a connection to the conferencing apparatus 50 using the SIP-URI of the conferencing apparatus 52 and the telephone number of the cellular phone 62 (S110). More specifically, the conferencing apparatus 52 sends the conferencing apparatus 50 an INVITE message of the SIP that includes the SIP-URI of the conferencing apparatus 52 and the telephone number of the cellular phone 62.

When the conferencing apparatus 50 that has received the INVITE message acquires the SIP-URI of the conferencing apparatus 52 and the telephone number of the cellular phone 62, it stores the SIP-URI of the conferencing apparatus 52 in the base information 102 and holds the telephone number of the cellular phone 62 in the RAM 203, etc. Further, the conferencing apparatus 50 sends the conferencing apparatus 52 a message that is a response to the INVITE message. Upon receiving the response message, the conferencing apparatus 52 sends the conferencing apparatus 50 an ACK message to acknowledge the response message.

A connection between the conferencing apparatus 50 and conferencing apparatus 52 is established by the series of processing steps described above.

On the basis of the base information 102 and information relating to the state of the connections to the other conferencing apparatuses, the conferencing apparatus 50 (base connection management module 105) determines whether the state of the connection between the conferencing apparatus 51 and conferencing apparatus 52 is the connected or unconnected state. In this example, the conferencing apparatus 51 and conferencing apparatus 52 have not yet been connected and the conferencing apparatus 50 has not received a connection result to the effect that the conferencing apparatus 51 and conferencing apparatus 52 have been connected. Therefore, the conferencing apparatus 50 determines that the conferencing apparatus 51 and conferencing apparatus 52 are in the unconnected state.

Accordingly, the conferencing apparatus 50 transmits a connect command to the conferencing apparatus 51 (or conferencing apparatus 52) (S111). More specifically, the conferencing apparatus 50 sends the conferencing apparatus 51 a REFER request of the SIP that includes the SIP-URI of the conferencing apparatus 52. The REFER request of the SIP is defined by RFC 3315, etc.

The conferencing apparatus 50 may be so adapted as to transmit the connect command to both the conferencing apparatus 51 and conferencing apparatus 52. More specifically, the conferencing apparatus 50 may be so adapted as to transmit a REFER request of the SIP that includes the SIP-URI of the conferencing apparatus 52 to the conferencing apparatus 51 and transmit a REFER request of the SIP that includes the SIP-URI of the conferencing apparatus 51 to the conferencing apparatus 52. In this case, whichever of the conferencing apparatus 51 and conferencing apparatus 52 is capable of starting processing sooner transmits the connection request to the other conferencing apparatus.

Upon receiving the connect command, the conferencing apparatus 51 establishes a connection to the conferencing apparatus 52 (S112). For example, the conferencing apparatus 51 stores the SIP-URI of the conferencing apparatus 52 included in the connect command (REFER request of the SIP) in the base information 102. Further, the conferencing apparatus 51 sends the conferencing apparatus 52 an INVITE message of the SIP that include the SIP-URI of the conferencing apparatus 51. Upon receiving the INVITE message, the conferencing apparatus 52 acquires the SIP-URI of the conferencing apparatus 51 and stores it in the base information 102. Further, the conferencing apparatus 52 sends the conferencing apparatus 51 a message that is in response to the INVITE message. Upon receiving the response message, the conferencing apparatus 51 sends the conferencing apparatus 52 an ACK message to acknowledge the response message.

A connection between the conferencing apparatus 51 and conferencing apparatus 52 is established by the series of processing steps described above.

When the connection of the conferencing apparatus 51 to the conferencing apparatus 52 is established, the conferencing apparatus 51 notifies the conferencing apparatus 50 of the result of the connection (S113). More specifically, in response to a NOTIFY request of the SIP, the conferencing apparatus 51 transmits a status code, which indicates the result of the connection, and call information defined by the SIP as connection information indicative of the connection between the conferencing apparatus 51 and conferencing apparatus 52. The call information includes Call-ID header information and tag information of a From header and a To header, etc.

The conferencing apparatus 50 receives the result of connection from the conferencing apparatus 51 at the transmission destination that transmitted the connect command and holds the result of connection in the RAM 203, etc., as information relating to the state of the connection.

Similarly, in accordance with user operation, the cellular phone 63 that has received the SIP-URI of the conferencing apparatus 50 notifies the conferencing apparatus 53, which is used by the user of the cellular phone 63, of the SIP-URI of the conferencing apparatus 50 and of its own telephone number (namely the telephone number of the cellular phone 63) (S114).

Upon receiving the SIP-URI of the conferencing apparatus 50 and the telephone number of the cellular phone 63, the conferencing apparatus 53 stores the SIP-URI of the conferencing apparatus 53 in the base information 102. Further, the conferencing apparatus 53 establishes a connection to the conferencing apparatus 50 using the SIP-URI of the conferencing apparatus 53 and the telephone number of the cellular phone 63 (S115). More specifically, the conferencing apparatus 53 sends the conferencing apparatus 50 an INVITE message of the SIP that includes the SIP-URI of the conferencing apparatus 53 and the telephone number of the cellular phone 63.

When the conferencing apparatus 50 that has received the INVITE message acquires the SIP-URI of the conferencing apparatus 53 and the telephone number of the cellular phone 63, it stores the SIP-URI of the conferencing apparatus 53 in the base information 102 and holds the telephone number of the cellular phone 63 in the RAM 203, etc. Further, the conferencing apparatus 50 sends the conferencing apparatus 53 a message that is a response to the INVITE message. Upon receiving the response message, the conferencing apparatus 53 sends the conferencing apparatus 50 an ACK message to acknowledge the response message.

A connection between the conferencing apparatus 50 and conferencing apparatus 53 is established by the series of processing steps described above.

On the basis of the base information 102 and information relating to the state of the connections to the other conferencing apparatuses, the conferencing apparatus 50 (base connection management module 105) determines whether the state of the connection between, e.g., the conferencing apparatus 51 and conferencing apparatus 53, is the connected or unconnected state. In this example, the information relating to the state of the connection between the conferencing apparatuses does not include a connection result to the effect that the conferencing apparatus 51 and conferencing apparatus 53 have been connected. Therefore, the conferencing apparatus 50 determines that the conferencing apparatus 51 and conferencing apparatus 53 are in the unconnected state.

Accordingly, the conferencing apparatus 50 transmits a connect command to the conferencing apparatus 51 (or conferencing apparatus 53) (S116). More specifically, the conferencing apparatus 50 sends the conferencing apparatus 51 a REFER request of the SIP that includes the SIP-URI of the conferencing apparatus 53.

Upon receiving the connect command, the conferencing apparatus 51 establishes a connection to the conferencing apparatus 53 (S117). For example, the conferencing apparatus 51 stores the SIP-URI of the conferencing apparatus 53 included in the connect command (REFER request of the SIP) in the base information 102. Further, the conferencing apparatus 51 sends the conferencing apparatus 53 an INVITE message of the SIP that include the SIP-URI of the conferencing apparatus 51. Upon receiving the INVITE message, the conferencing apparatus 53 acquires the SIP-URI of the conferencing apparatus 51 and stores it in the base information 102. Further, the conferencing apparatus 53 sends the conferencing apparatus 51 a message that is in response to the INVITE message. Upon receiving the response message, the conferencing apparatus 51 sends the conferencing apparatus 53 an ACK message to acknowledge the response message.

A connection between the conferencing apparatus 51 and conferencing apparatus 53 is established by the series of processing steps described above.

When the connection of the conferencing apparatus 51 to the conferencing apparatus 53 is established, the conferencing apparatus 51 notifies the conferencing apparatus 50 of the result of the connection (S118). More specifically, in response to a NOTIFY request of the SIP, the conferencing apparatus 51 transmits a status code, which indicates the result of the connection, and call information defined by the SIP as connection information indicative of the connection between the conferencing apparatus 51 and conferencing apparatus 53. The conferencing apparatus 50 receives the result of connection from the conferencing apparatus 51 and holds the result of connection in the RAM 203, etc., as information relating to the state of the connection.

Further, on the basis of the base information 102 and information relating to the state of the connections to the other conferencing apparatuses, the conferencing apparatus 50 (base connection management module 105) determines whether the state of the connection between, e.g., the conferencing apparatus 52 and conferencing apparatus 53, is the connected or unconnected state. In this example, the information relating to the state of the connection between the conferencing apparatuses does not include a connection result to the effect that the conferencing apparatus 52 and conferencing apparatus 53 have been connected. Therefore, the conferencing apparatus 50 determines that the conferencing apparatus 52 and conferencing apparatus 53 are in the unconnected state.

Accordingly, the conferencing apparatus 50 transmits a connect command to the conferencing apparatus 52 (or conferencing apparatus 53) (S119). More specifically, the conferencing apparatus 50 sends the conferencing apparatus 52 a REFER request of the SIP that includes the SIP-URI of the conferencing apparatus 53.

Upon receiving the connect command, the conferencing apparatus 52 establishes a connection to the conferencing apparatus 53 (S120). For example, the conferencing apparatus 52 stores the SIP-URI of the conferencing apparatus 53 included in the connect command (REFER request of the SIP) in the base information 102. Further, the conferencing apparatus 52 sends the conferencing apparatus 53 an INVITE message of the SIP that include the SIP-URI of the conferencing apparatus 52. Upon receiving the INVITE message, the conferencing apparatus 53 acquires the SIP-URI of the conferencing apparatus 52 and stores it in the base information 102. Further, the conferencing apparatus 53 sends the conferencing apparatus 52 a message that is in response to the INVITE message. Upon receiving the response message, the conferencing apparatus 52 sends the conferencing apparatus 53 an ACK message to acknowledge the response message.

A connection between the conferencing apparatus 52 and conferencing apparatus 53 is established by the series of processing steps described above.

When the connection of the conferencing apparatus 52 to the conferencing apparatus 53 is established, the conferencing apparatus 52 notifies the conferencing apparatus 50 of the result of the connection (S121). More specifically, in response to a NOTIFY request of the SIP, the conferencing apparatus 52 transmits a status code, which indicates the result of the connection, and call information defined by the SIP as connection information indicative of the connection between the conferencing apparatus 52 and conferencing apparatus 53. The conferencing apparatus 50 receives the result of connection from the conferencing apparatus 52 and holds the result of connection in the RAM 203, etc., as information relating to the state of the connection.

If the conferencing apparatus 50 determines that the telephone numbers held in the RAM 203, etc. and the telephone numbers of respective users stored in the participant information 103 all coincide and, moreover, if the connections between the conferencing apparatuses are indicative of the connected state, then it determines that setup of the conference network has been completed.

Thus, as described above, on the basis of connection information included in connection requests received from respective ones of the conferencing apparatuses 51, 52, 53 (the plurality of conferencing apparatuses), the conferencing apparatus 50 sends the conferencing apparatuses 51, 52, 53 connect commands for effecting connection between the conferencing apparatuses 51, 52, 53. The connection information included in the connection request that the conferencing apparatus 50 has received from the conferencing apparatus 51 (52, 53) is information that enables the conferencing apparatus 50 to be connected to the conferencing apparatus 51 (52, 53) using this connection information. For example, it is the SIP-URI of the conferencing apparatus 51 (52, 53).

Figure 5:
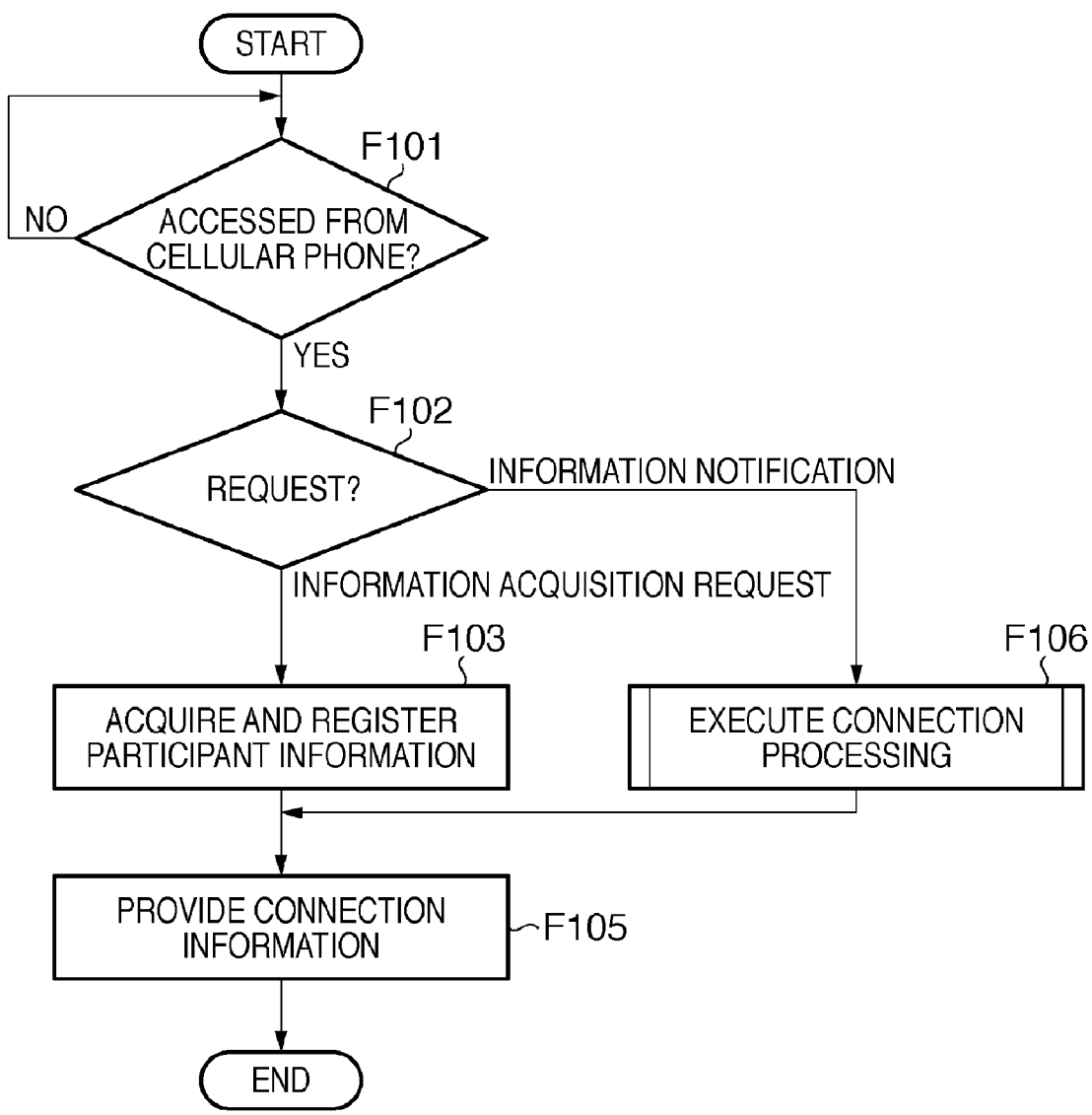
FIG. 5 is a flowchart illustrating an example of processing when a conferencing apparatus is accessed from a cellular phone.

FIG. 5 is a flowchart illustrating an example of processing when the conferencing apparatus 50 is accessed from the cellular phone 60. Similar processing is executed in the conferencing apparatuses 51 to 53.

If the conferencing apparatus 50 has been accessed from the cellular phone 60 ("YES" at F101), then the conferencing apparatus 50 analyzes the request relating to access (F102). If the result of analysis is that the request from the cellular phone 60 is an information acquisition request, then the conferencing apparatus 50 acquires the telephone numbers of the cellular phones 61 to 63 as participant information from this information acquisition request and registers the telephone numbers in the participant information 103 (F103).

Further, the conferencing apparatus 50 acquires its own SIP-URI from the connection information 101 and supplies it to the cellular phone 60 (F105).

On the other hand, if the result of analysis is that the request from the cellular phone 60 is information notification, then the conferencing apparatus 50 acquires the SIP-URI of the conferencing apparatus at the connection destination from the information notification and executes processing for connecting to the conferencing apparatus (F106). In FIG. 4, this processing is executed by the conferencing apparatuses 51, 52, 53. More specifically, as mentioned above, the conferencing apparatus 50 stores the SIP-URI of the conferencing apparatus at the connection destination included in the information notification in the base information 102. Further, the conferencing apparatus 50 establishes a connection with the conferencing apparatus at the connection destination using the telephone number of the cellular phone 60 of the user who uses the conferencing apparatus 50 and the SIP-URI of the conferencing apparatus 50, these being included in the information notification. In other words, the conferencing apparatus 50 sends the conferencing apparatus at the connection destination an INVITE message of the SIP that includes the telephone number of the cellular phone 60 and the SIP-URI of the conferencing apparatus 50. Upon receiving the INVITE message, the conferencing apparatus at the connection destination acquires the SIP-URI of the conferencing apparatus 50 and stores it in the base information 102. Further, the conferencing apparatus at the connection destination sends the conferencing apparatus 50 a message that is a response to the INVITE message. Upon receiving the response message, the conferencing apparatus 50 sends the conferencing apparatus at the connection destination an ACK message to acknowledge the response message.

Figure 6:
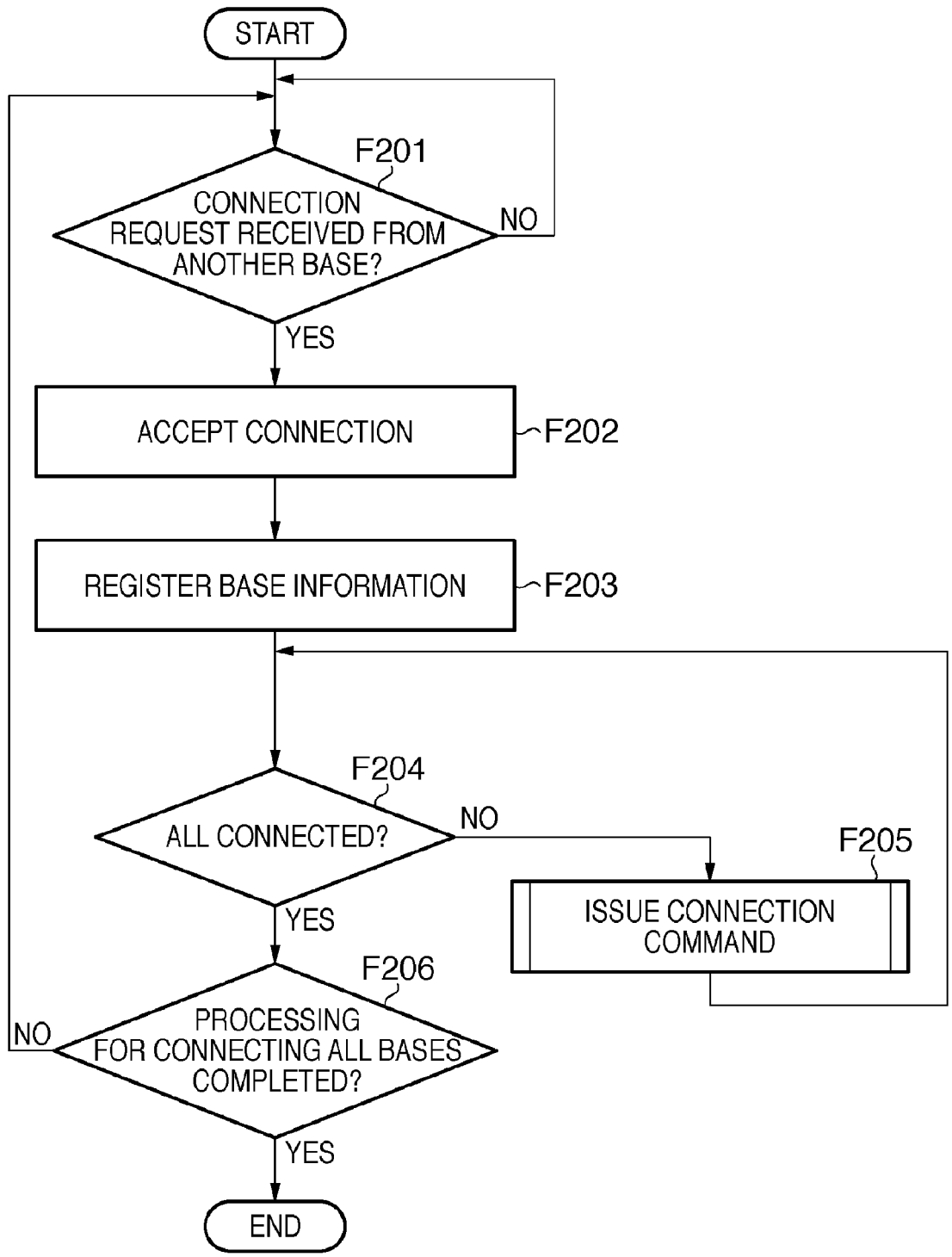
FIG. 6 is a flowchart illustrating an example of processing for when a conferencing apparatus used by a conference convener receives a connection request from a conferencing apparatus at another base.

FIG. 6 is a flowchart illustrating an example of processing for when the conferencing apparatus 50 used by a conference convener receives a connection request from a conferencing apparatus at another base. The conferencing apparatus 50 receives a connection request from another conferencing apparatus (e.g., conferencing apparatus 51) (F201) and accepts the connection (F202). It should be noted that in order to simplify the description, a case where a connection request has been received from the conferencing apparatus 51 will be taken as an example below.

Next, the conferencing apparatus 50 registers the SIP-URI of the conferencing apparatus 51, acquired when connection processing is received, in the base information 102 (F203). Further, the conferencing apparatus 50 holds the telephone number of the cellular phone 61, acquired when connection processing is received, in the RAM 203, etc.

On the basis information relating to the base information 102 and state of connection to other conferencing apparatuses, the conferencing apparatus 50 determines the state of the connection between the conferencing apparatus 51 and other conferencing apparatuses (e.g., conferencing apparatus 52 and conferencing apparatus 53) already connected to the conferencing apparatus 50 (F204). If the conferencing apparatus 50 determines that the conferencing apparatus 51 has been connected to all of the other conferencing apparatuses (e.g., conferencing apparatus 52 and conferencing apparatus 53) already connected to the conferencing apparatus 50, then control proceeds to F206. If the conferencing apparatus 50 determines that a conferencing apparatus that has not been connected exists, the control proceeds to F205.

At F205, the conferencing apparatus 50 sends the conferencing apparatus 51 the SIP-URI of the unconnected conferencing apparatus (e.g., conferencing apparatus 52) and instructs that the connection be made.

At F206, on the other hand, the conferencing apparatus 50 determines whether processing for connecting to all bases has been completed. This determination is made based upon whether the telephone number of each user included in the participant information 103 registered at F103 coincides with the telephone numbers acquired by connection of the conferencing apparatus 50 to the other conferencing apparatuses and retained in the RAM 203, etc., at F203. If the conferencing apparatus 50 determines that processing for connecting to all bases has been completed, then the processing of FIG. 6 is exited. If it is determined that processing for connecting to all bases has not been completed, then control returns to F201.

Figure 7:
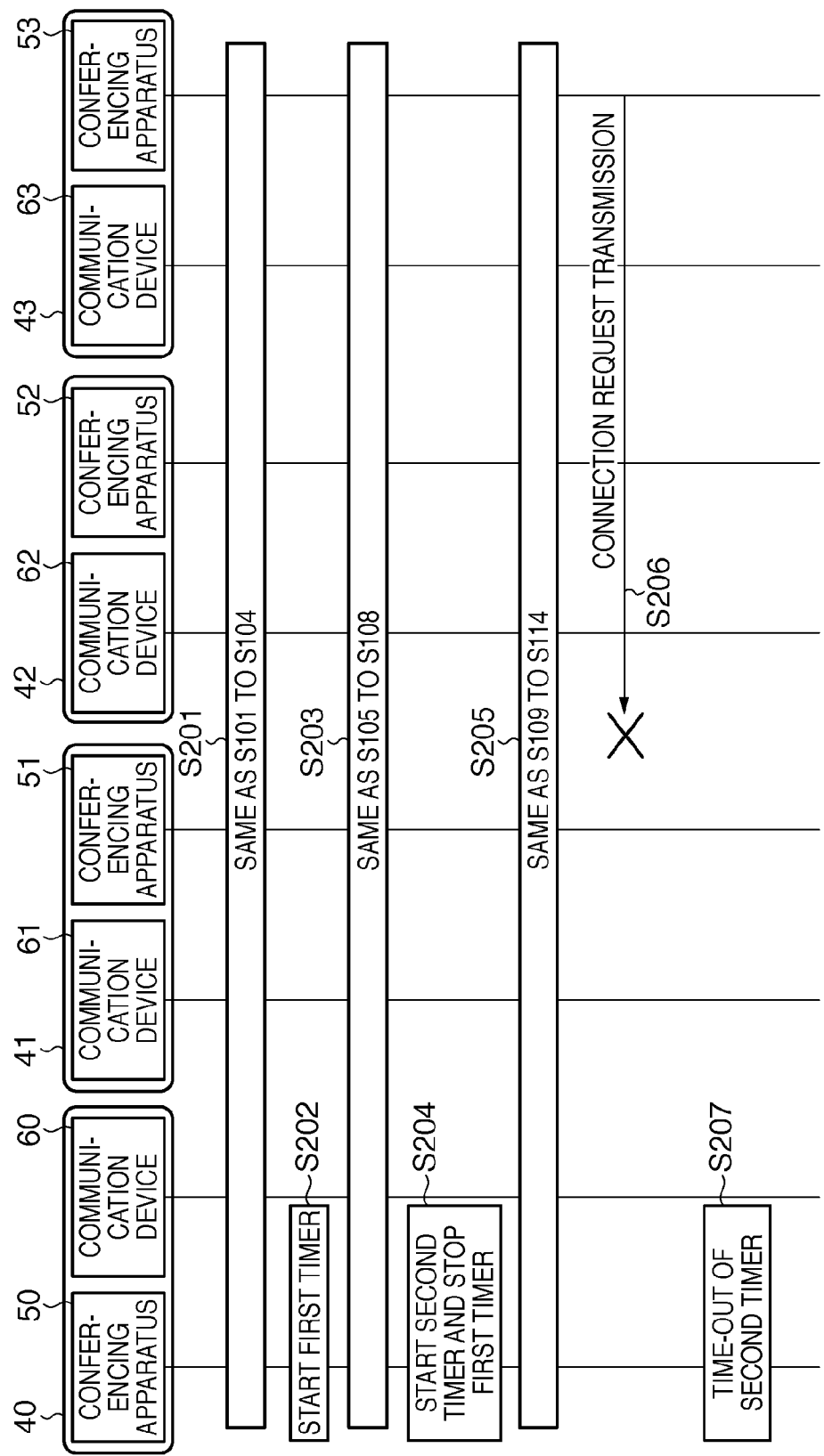
FIG. 7 is a diagram illustrating an example of a sequence relating to processing in a case where processing for connecting a conferencing apparatus used by a conference participant to a conferencing apparatus used by a conference convener has not been executed for some reason.

FIG. 7 is a diagram illustrating an example of a sequence relating to processing in a case where processing for connecting the conferencing apparatus 53 used by a conference participant to the conferencing apparatus 50 used by the conference convener has not been executed for some reason.

At S201, processing similar to S101 to S104 of FIG. 4 is executed (this processing is not described again). Next, the conferencing apparatus 50 starts a first timer after communication with the cellular phone 60 ends (S202). The startup of the first timer is performed at the same time as the distribution of information at S105 in FIG. 4 (S203). At S203, processing similar to that of S105 to S108 of FIG. 4 (this is not described again).

Upon receiving a connection request from the conferencing apparatus 51, the conferencing apparatus 50 starts a second timer and stops the first timer (S204). It should be noted that the conferencing apparatus 50 determines that construction of the conference network has failed also in a case where the first timer has timed out. The first timer decides a limit time that extends from the distribution of information at S105 in FIG. 4 to receipt of the initial connection request among the connection requests from the conferencing apparatuses 51, 52, 53. The second timer decides a limit time that extends from receipt of the initial connection request among the connection requests from the conferencing apparatuses 51, 52, 53 to receipt of the final connection request. At S205, processing similar to that of S109 to S114 of FIG. 4 (this is not described again).

Here it will be assumed that a connection request from the conferencing apparatus 53 could not be received by the conferencing apparatus 50 owing to an error internally of the conferencing apparatus 53 or a network failure between the conferencing apparatus 50 and conferencing apparatus 53 (S206). In this case the conferencing apparatus 50 detects time-out of the second timer (S207) and determines that construction of the conference network has failed. It should be noted that rather than dividing a time limit into the first and second timers, the time from distribution of information at S105 (S203) in FIG. 4 to receipt of the final connection request among the connection requests from the conferencing apparatuses 51, 52, 53 may be provided as the time limit. In this case, it is determined that construction of the conference network has failed if the final connection request is not received within this period of time.

In other words, by starting a timer in accordance with a certain timing, the conferencing apparatus 50 is capable of determining that construction of the conference network has failed if a prescribed request (or information) cannot be received by the time this timer times out.

Figure 8:
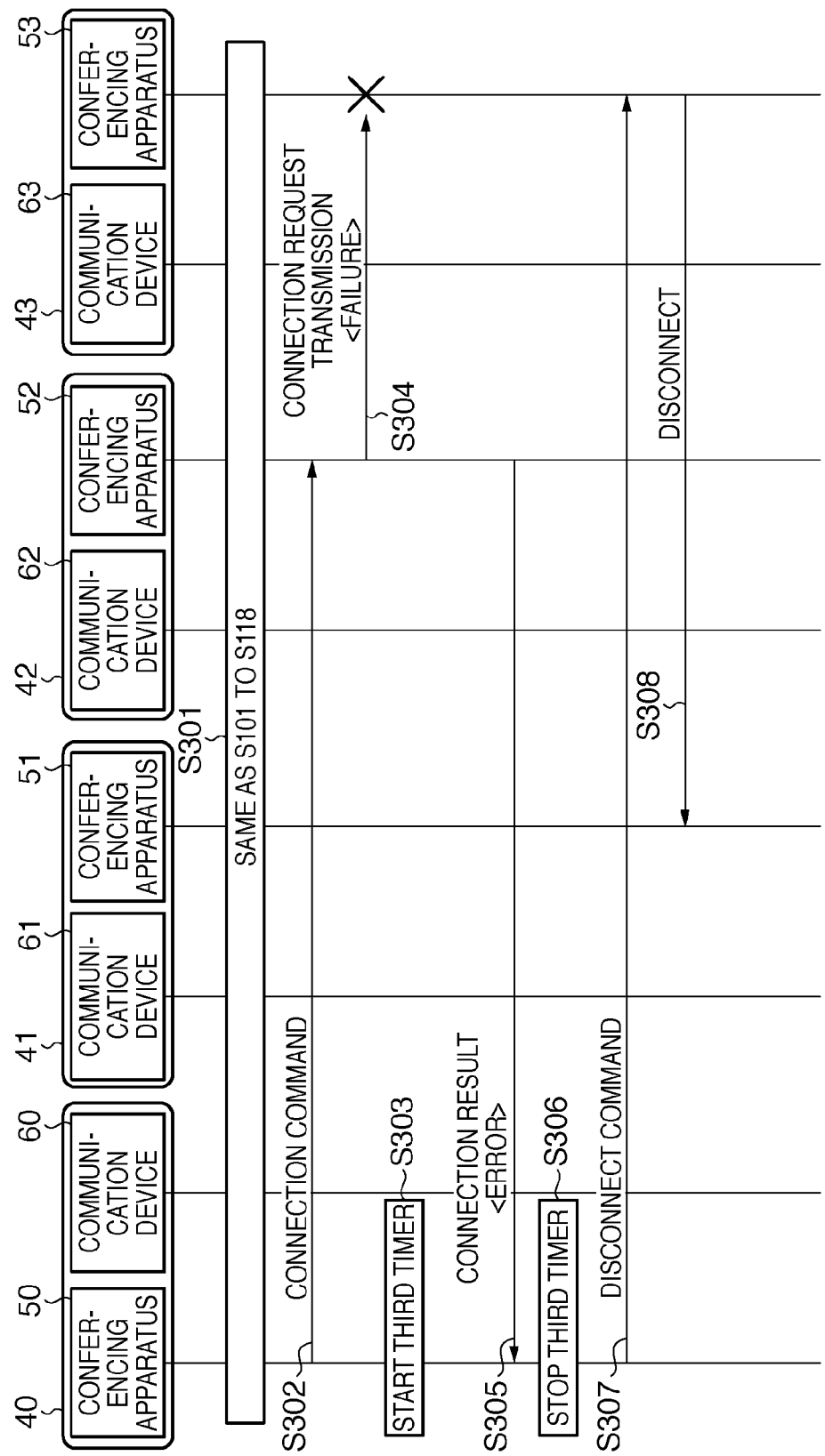
FIG. 8 is a diagram illustrating an example of a sequence relating to processing in a case where an error has occurred when a conferencing apparatus used by a conference convener instructs connection to another conferencing apparatus and the connection to the other conferencing apparatus is established.

FIG. 8 is a diagram illustrating an example of a sequence relating to processing in a case where an error has occurred when the conferencing apparatus 50 used by a conference convener instructs connection to another conferencing apparatus and the connection to the other conferencing apparatus is established in accordance with this instruction.

At S301, processing similar to that of S101 to S118 of FIG. 4 is executed (this processing is not described again). Next, the conferencing apparatus 50 sends the conferencing apparatus 52 a connect command (S302). This is similar to S119 in FIG. 4. More specifically, the conferencing apparatus 50 sends the conferencing apparatus 52 a REFER request of the SIP that includes the SIP-URI of the conferencing apparatus 53. Next, the conferencing apparatus 50 starts up a third timer after the connect command is transmitted (S303).

In a case where an error has occurred in connecting the conferencing apparatus 52 and conferencing apparatus 53, the conferencing apparatus 50 receives from the conferencing apparatus 52 a connection result that includes an error code (S305). Upon receiving the connection result, the conferencing apparatus 50 stops the third timer.

If the conferencing apparatus 50 receives the connection result that includes error code or the third timer times out before the connection result is received, then the conferencing apparatus 50 determines that the connection between the conferencing apparatus 52 and conferencing apparatus 53 has failed. Although operation when a connect command is transmitted at S302 (S119) has been described, the third timer is started similarly at S111 and S116 in FIG. 4 and transmission of the connection result is awaited similarly at S113 and S118 in FIG. 4.

Next, the conferencing apparatus 50 determines whether the conferencing apparatus 53 is in a state in which it is already connected to another conferencing apparatus and, if it is already connected to another conferencing apparatus, issues a disconnect command so as to sever the connection to the other conferencing apparatus (S307). Here the conferencing apparatus 50 determines whether the conferencing apparatus 53 is in a state in which it is already connected to another conferencing apparatus based upon the base information 102 and information relating to the state of the connection to the other conferencing apparatus. More specifically, the conferencing apparatus 50 includes "disconnect" call information in a REFER request of the SIP and transmits the resultant signal as the disconnect command to the other conferencing apparatus currently connected to the conferencing apparatus 53.

Upon receiving the disconnect command, the conferencing apparatus 53, in order to sever the connection to the conferencing apparatus (e.g., conferencing apparatus 51) that has already been connected, transmits a BYE request of the SIP to this conferencing apparatus to be disconnected in accordance with the disconnect command (S308).

Thus, in accordance with this embodiment as described above, in a case where a network is constructed and a conference held without utilizing an MCU or Web conferencing service, it is possible to construct the network reliably and to hold the conference easily with only a few operational steps by the user irrespective of the number of participating bases.

Other Embodiments

Further, the object of the invention is attained by adopting the arrangement described below. Specifically, a storage medium (or recording medium) on which the program codes of the software for implementing the functions of the foregoing embodiment is supplied to a system or apparatus. Central processing means (CPU or MPU) of the system or apparatus reads out and executes the program codes stored on the storage medium. In this case, the program codes per se read from the storage medium implement the functions of the embodiment and the recording medium storing the program codes constitutes the invention.

Further, by executing the program codes read out by the central processing means of the system or apparatus, an operating system or the like running on the system or apparatus executes some or all of the actual processing based upon the indications in the program codes. A case where the functions of the above-described embodiment are implemented by this processing also is covered by the present invention.

Furthermore, program code read from a storage medium is written to a memory provided on a function expansion card inserted into the computer or provided in a function expansion unit connected to the computer. Thereafter, a CPU or the like provided on the function expansion card or function expansion unit performs some or all of actual processing based upon the indication in the program codes, and the functions of the above embodiment are implemented by this processing. Such a case also is covered by the present invention.

In a case where the present invention is applied to the above-mentioned storage medium, program code corresponding to the flowcharts described earlier are stored on the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-307780, filed on Nov. 28, 2007, which is hereby incorporated by reference herein in its entirety.

What is claimed is:

1. A connection method in a conferencing system comprising a plurality of bases including a first base and a plurality of second bases, wherein, the first base includes at least a first conferencing apparatus and a first communication device, and wherein each of the plurality of second bases includes at least a second conferencing apparatus and a corresponding second communication device, wherein the connection method is for connecting the first conferencing apparatus to the plurality of second conferencing apparatuses and connecting the plurality of second conferencing apparatuses together, the method comprising the steps of:

receiving from the first communication device a request for first connection information for connecting to the first conferencing apparatus;

transmitting to the first communication device the first connection information;

calling the plurality of second communication devices by using the first communication device;

transmitting the first connection information to the plurality of second communication devices by using the first communication device which called the plurality of second communication devices;

receiving the first connection information by each of the plurality of second conferencing apparatuses, wherein the first connection information is received by each of the second conferencing apparatuses from its corresponding second communication device;

transmitting a connection request by each of the plurality of second conferencing apparatuses to the first conferencing apparatus, wherein the connection request comprises a request for connecting to the first conferencing apparatus, based upon the first connection information;

receiving from each second conferencing apparatus the connection request;

detecting second connection information included in each connection request; and instructing by the first conferencing apparatus to one of the plurality of second conferencing apparatuses to connect to another one of the plurality of second conferencing apparatuses based upon the second connection information.

2. The method according to claim 1, wherein the first conferencing apparatus determines whether the plurality of second conferencing apparatuses have been connected together and instructs as yet unconnected second conferencing apparatuses among the plurality of second conferencing apparatuses to connect themselves together.

3. The method according to claim 1, wherein the first conferencing apparatus determines whether the connection requests are received from the plurality of second conferencing apparatuses within a prescribed period of time.

4. The method according to claim 1, wherein a second conferencing apparatus that has been instructed by the first conferencing apparatus to connect itself to the plurality of second conferencing apparatuses sends the first conferencing apparatus an indication as to whether the connecting together of the plurality of second conferencing apparatuses has succeeded or not.

5. The method according to claim 1, wherein the first conferencing apparatus instructs one of the second conferencing apparatuses, which has failed to connect to the other second conferencing apparatuses, to disconnect.

6. The method according to claim 1, further comprising the steps of:
the first conferencing apparatus receiving identification information of the plurality of second communication devices from the first communication device;
the plurality of second conferencing apparatuses transmitting the identification information of the plurality of second communication devices to the first conferencing apparatus; and
the first conferencing apparatus determining whether the identification of the plurality of second communication devices, which has been received from the first communication device, is received from the plurality of second conferencing apparatuses.

7. A conferencing apparatus in a conferencing system comprising a plurality of bases including a first base and a plurality of second bases, wherein, the first base includes at least a first conferencing apparatus and a first communication device, and wherein each of the plurality of second bases includes at least a second conferencing apparatus and a corresponding second communication device, wherein each second communication device receives first connection information for connecting to the first conferencing apparatus from the first communication device and wherein one second conferencing apparatus is connected to the first conferencing apparatus and the one second conferencing apparatus is further connected to another second conferencing apparatus, wherein the first conferencing apparatus comprises:
receiving means for receiving from the first communication device a request for the first connection information;
transmitting means for transmitting to the first communication device the first connection information;
receiving means for receiving from each second conferencing apparatus a connection request including second connection information for connecting to the second conferencing apparatus, the connection request being transmitted by the second conferencing apparatus based on the first connection information received from its corresponding second communication device;
detecting means for detecting the second connection information included in each connection request; and
instructing means for instructing the plurality of second conferencing apparatuses, from which the connection requests are received, to connect themselves together based upon the second connection information.

8. The apparatus according to claim 7, wherein the instructing means has determination means for determining whether the plurality of second conferencing apparatuses have been connected together; and
the instructing means instructs as yet unconnected second conferencing apparatuses among the plurality of second conferencing apparatuses to connect themselves together.

9. The apparatus according to claim 7, wherein the receiving means has determination means for determining whether the connection requests are received from the plurality of second conferencing apparatuses within a prescribed period of time.

10. The apparatus according to claim 7, wherein the instructing means instructs a second conferencing apparatus that has failed to be connected to the other second conferencing apparatuses to disconnect.

11. The apparatus according to claim 7, further comprising second receiving means for receiving identification information of a plurality of second communication devices from a first communication device;
wherein the receiving means has determination means for determining whether the identification of the plurality of second communication devices, which has been received from the first communication device, is received from the plurality of second conferencing apparatuses.

12. A non-transitory computer-readable storage medium storing a computer-executable program for connecting a plurality of conferencing apparatuses together in a conferencing system comprising a plurality of bases including a first base and a plurality of second bases, wherein, the first base includes at least a first conferencing apparatus and a first communication device, and wherein each of the plurality of second bases includes at least a second conferencing apparatus and a corresponding second communication device, wherein each second communication device receives first connection information for connecting to the first conferencing apparatus from the first communication device and wherein one second conferencing apparatus is connected to the first conferencing apparatus and the one second conferencing apparatus is further connected to another second conferencing apparatus, wherein the computer program includes the steps of:
receiving from the first communication device a request for the first connection information;
transmitting to the first communication device the first connection information;
receiving from each second conferencing apparatus a connection request including second connection information for connecting to the second conferencing apparatus, the connection request being transmitted by the second conferencing apparatus based on the first connection information received from its corresponding second communication device;
detecting the second connection information included in each connection request; and
instructing the plurality of second conferencing apparatuses, from which the connection requests are received, to connect themselves together based upon the second connection information.

13. The non-transitory storage medium according to claim 12, wherein the instructing step has a step of determining whether the plurality of second conferencing apparatuses have been connected together; and
the instructing step instructs as yet unconnected second conferencing apparatuses among the plurality of second conferencing apparatuses to connect themselves together.

14. The non-transitory storage medium according to claim 12, wherein the receiving step has a step of determining whether the connection requests are received from the plurality of second conferencing apparatuses within a prescribed period of time.

15. The non-transitory storage medium according to claim 12, wherein the instructing step has a step of instructing a second conferencing apparatus that has failed to be connected to the other second conferencing apparatuses to disconnect.

16. The non-transitory storage medium according to claim 12, further comprising:
a second receiving step of receiving identification information of the plurality of second communication devices from the first communication device; and
a determination step of determining whether the identification of the plurality of second communication devices, which has been received from the first communication device, is received from the plurality of second conferencing apparatuses.

17. The method according to claim 1, wherein the first communication device calls the plurality of second communication devices by a push to talk over cellular communication, and transmits the first communication information by a push to talk over cellular communication.

18. A conferencing method in a conferencing system comprising a plurality of bases including a first base and a plurality of second bases, wherein, the first base includes at least a first conferencing apparatus and a first communication device, and wherein each of the plurality of second bases includes at least a second conferencing apparatus and a corresponding second communication device, wherein each second communication device receives first connection information for connecting to the first conferencing apparatus from the first communication device and wherein one second conferencing apparatus is connected to the first conferencing apparatus and the one second conferencing apparatus is further connected to another second conferencing apparatus, wherein the first conferencing apparatus performs:

receiving from the first communication device a request for the first connection information;

transmitting to the first communication device the first connection information;

receiving from each second conferencing apparatus a connection request including second connection information for connecting to the second conferencing apparatus, the connection request being transmitted by the second conferencing apparatus based on the first connection information received from its corresponding second communication device;

detecting the second connection information included in each connection request; and instructing the plurality of second conferencing apparatuses from which the connection requests are received to connect themselves together based upon the second connection information.

* * * * *